(12) United States Patent
Kelly et al.

(10) Patent No.: US 7,167,834 B1
(45) Date of Patent: Jan. 23, 2007

(54) GARDEN AND AGRICULTURAL MATERIAL IDENTIFICATION METHOD AND APPARATUS

(75) Inventors: J. Keith Kelly, Newborn, GA (US); Peter Stuart Edmondson, Alpharetta, GA (US)

(73) Assignee: Kelly Registration Systems, Inc., Covington, GA (US)

( * ) Notice: Subject to any disclaimer, the term of this patent is extended or adjusted under 35 U.S.C. 154(b) by 682 days.

(21) Appl. No.: 09/373,576

(22) Filed: Aug. 13, 1999

(51) Int. Cl.
*G06Q 30/00* (2006.01)

(52) U.S. Cl. .............................. 705/26; 705/27; 707/10; 709/232; 715/764

(58) Field of Classification Search ................ 705/26, 705/1, 5, 27; 395/209; 707/10; 715/764; 709/232; 714/798; 702/5
See application file for complete search history.

(56) References Cited

U.S. PATENT DOCUMENTS

| | | | | |
|---|---|---|---|---|
| 5,440,479 A | * | 8/1995 | Hutton | 705/26 |
| 5,726,884 A | * | 3/1998 | Sturgeon et al. | 340/915 |
| 5,960,411 A | * | 9/1999 | Hartman et al. | 705/26 |
| 5,974,388 A | * | 10/1999 | Durham | 235/385 |
| 6,064,979 A | * | 5/2000 | Perkowski | 235/375 |
| 6,085,351 A | * | 7/2000 | Alberty | 714/798 |
| 6,304,850 B1 | * | 10/2001 | Keller et al. | 705/5 |
| 6,307,573 B1 | * | 10/2001 | Barros | 715/764 |
| 6,477,531 B1 | * | 11/2002 | Sullivan et al. | 707/10 |
| 6,721,795 B1 | * | 4/2004 | Eldreth | 709/232 |

FOREIGN PATENT DOCUMENTS

| | | |
|---|---|---|
| EP | 0 255 566 A1 * | 2/1988 |
| WO | WO 01/02997 A1 * | 1/2001 |

OTHER PUBLICATIONS

Gerald et al, (Article by Gerland Jim, and Winer, Mark, Taking a Spade to the Web, Buffalo News; Buffalo, N.Y.; Apr. 7, 1998, pp. 2, extracted on Internet on Jan. 15, 2002 from Proquest database.*
Whiteflower.com, http://www.whiteflower.com, refer to the history, web-pages enclose3*
Anonymous, Gardening, NEA Today; Washington; Apr. 1998, vol. 16, Issue: 8, extracted from Internet from Proquest database on Jan. 16, 2002.*

(Continued)

*Primary Examiner*—Yogesh C. Gare
(74) *Attorney, Agent, or Firm*—McKenna Long & Aldridge LLP

(57) ABSTRACT

A method and apparatus identifies an appropriate gardening based upon user responses to a plurality of inquiries. Inquiries may include location of the gardening need (lawn, vegetable, house, pet, etc.), as well as type of pest (insect, weed, etc.). In a preferred embodiment, the method is practiced as an Internet site that provides the user with the opportunity to purchase identified gardening materials through the Internet. In a preferred embodiment, the gardening materials are identified based at least in part upon the geographic location of the user, which may be specified by zip code, state, region of the country or any combination of these. The product label, which may differ from state to state, is also displayed in a preferred embodiment based upon the state indicated by the user.

16 Claims, 7 Drawing Sheets

OTHER PUBLICATIONS

Santelmann, Or, you could blast them with raid, Forbes; New York; Spring 1998, Supplement: FYI-The Good Life: Travel Issue, extracted from Internet from Proquest database on Jan. 16, 2002.*

Gerland et al, (Article by Gerland Jim, and Winer, Mark, Taking a Spade to the Web, Buffalo News; Buffalo, N.Y.; Apr. 7, 1998 pp. 2, extracted on Internet on Jan. 15, 2002 from Proquest database & copies of webpages marked 1 through 19.*

Definitions of "Web site-p. 506", Web browser-p. 505, Http server-p. 239, and "serve-p. 430r" extracted from "Microsoft Press Computer Dictionary", third edition 1997, Microsoft Press, Redmond Washington.*

Consumer Labeling Initiative; Notice of Project Initiation, Federal Register: Mar. 22, 1996, vol. 61, No. 57-Notices, pp. 12011-12013, extracted from www.epa.gov on Jun. 28, 2002.*

Notice, EPA Questions & Answers The Consumer Labeling Initiative, Sep. 4, 1997 extracted from www.epa.gov on Jun. 28, 2002.*

Gerland Jim, and Winer, Mark, Taking a Spade to the Web, Buffalo News; Buffalo, N.Y.; Apr. 7, 1998, pp. 1-2, extracted on Internet on Jan. 15, 2002 from Proquest database: http://proquest.umi.com.*

Web pages, as existed in Jan. 1999, from http://web.archive.org/web/19990128180853/ http://www2.garden.org, pp. 1 2, extracted on Internet on Jan. 16, 2002 from Proquest database: http://proquest.umi.com.*

Trivette, Donald B.; "How does your garden grow? Landscaping with your PC (Multicom Publishing Better Homes and Gardens Complete Guide to Gardening; Books that work 3D Landscape; Green Thums Software LandDesigner Multimedia for Gardens; The Larch Treeselect) (After Hours) (Software Review) (Evaluation)"; PC Magazine, v14, n7, p. 361 (2); Apr. 11, 1.*

Garden.com, http://www4.garden.com/index.html, note plant finder feature.

* cited by examiner

GARDEN AND AGRICULTURAL MATERIAL IDENTIFICATION METHOD AND APPARATUS

BACKGROUND OF THE INVENTION

1. Field of the Invention

The present invention relates generally to the field of gardening and agriculture and more particularly to a method and apparatus for identifying an appropriate gardening or agricultural material based on responses to user queries.

2. Description of Related Art

There are a wide variety of regulated gardening and agricultural materials (hereinafter referred to as gardening materials) including, but not limited to, pesticides, fertilizers and seeds, that are available to today's gardeners, homeowners, pest-control operators, professional applicators, greens-keepers, extension agencies, state agencies, professional advisors, poison control centers and farmers. As used herein, a "pesticide" refers to a material which may be used to kill a pest. Pests may include insects, fungi, nematodes, snails/slugs, weeds and diseases. Pests may be found outside or inside the home. Accordingly, pesticides include such diverse products as flea sprays, bathroom tile cleaners, and pool cleaners as well as more familiar garden and farm pesticides.

A difficult decision arises when one has to select an appropriate gardening material to address a specific problem. For example, one type of pesticide is insecticide. When faced with an insect problem, one must first identify the type of insect. Then one must select an appropriate insecticide based on where (e.g. vegetable or other edible vegetation, ornamental shrub, lawn, house, etc.) the problem is occurring. Once the appropriate insecticide is identified, one must select from a number of commercial products and application methods (e.g. powder, spray, systemic, time-released, etc.). Often one is not even aware of what the problem is (insect, fungus or other), but instead simply has a symptom as the sole basis of identification.

The aforementioned problem is further complicated by the fact that the "right" garden material may vary across different regions of the country and even different states in the same region. Additionally, the increasing sales of gardening materials by large chain stores with inadequately trained sales personnel further exacerbates the consumer's dilemma.

What is needed is a method and apparatus for identifying an appropriate gardening material based on user input.

SUMMARY OF THE INVENTION

The present inventions meet the aforementioned need to a great extent by providing a method and apparatus for identifying gardening materials based on user responses to a series of queries. The queries allow the gardener to specify the type of area (e.g. lawn, garden, etc.) in which a problem exists; the type of problem (e.g. insect, fungus, characteristics of the problem, etc.); and the geographic location of the problem. In a preferred embodiment, the geographic location may be specified by zip code, state, region of the country, or any combination of these. The ability to specify geographic location by state is especially helpful when choosing gardening materials such as pesticides, fertilizers and lawn seeds because such materials are regulated by state. A pesticide that is legal in one state may not be legal in the next. Even if a pesticide is legal in a state, it may not be legal for all applications. For example, a pesticide that is legal in one state for vegetables as well as ornamental shrubs may not be legal for vegetables in other states. Specifying a location by both state and region is especially useful for large states with relatively large climatic variation such as California.

Once the appropriate user responses have been obtained, appropriate garden materials are identified to the user. In a preferred embodiment, the gardening materials are identified by both ingredient (e.g. diazinon, Kentucky bluegrass) and brand name (e.g. Ortho®, Scotts®). In a preferred embodiment, the method is performed by an Internet site and the user is given the choice of purchasing the products online or a local retailer from whom the products are available is identified to the gardener. In another preferred embodiment, the method is performed within garden retailers through a stand-alone or networked computer system, which may be referred to as a point-of-sale system or display.

BRIEF DESCRIPTION OF THE DRAWINGS

The foregoing and other advantages and features of the present inventions will be more readily understood with reference to the following figures, in which.

DETAILED DESCRIPTION

The present inventions will be discussed with reference to preferred embodiments of a method in the form of a computer program. Numerous specific details, such as specific country regions, specific user queries, the order of the queries, etc. are set forth in order to provide a thorough understanding of the present inventions. The preferred embodiments described herein are for the purposes of illustration only and should not be understood to limit the inventions.

The inventions will be discussed with reference to a flowchart. The flowchart makes numerous mention of querying a user for information. This act may be performed in a number of different ways. For example, in a preferred embodiment, the invention is practiced as an Internet site. In such an embodiment, the act of querying is performed by presenting a user with a number of choices that the user may "click" on to indicate a response. Such choices may be presented textually, such as by providing a number of hypertext links that move the user to a different portion of a hypertext document or different documents; or graphically, such as by providing a map of the U.S. divided into different regions so that users may "click" on the desired region to indicate their response. The regions may likewise be links to different portions of the hypertext document or to other documents.

Many other embodiments are also contemplated. Such embodiments include point-of-sale displays, which may provide for simple textual interaction (such as an embodiment in which the display consists of a simple alphanumeric device and a user responds with a numerical keypad to a series of textual inquiries) or more complex world-wide-web-like interaction. Obviously, embodiments such as point-of-sale embodiments may not have some of the features included in preferred embodiments discussed herein, such as presenting a user with a list of retail outlets where the product may be purchased (although a list of store locations may be presented).

Figure 1:
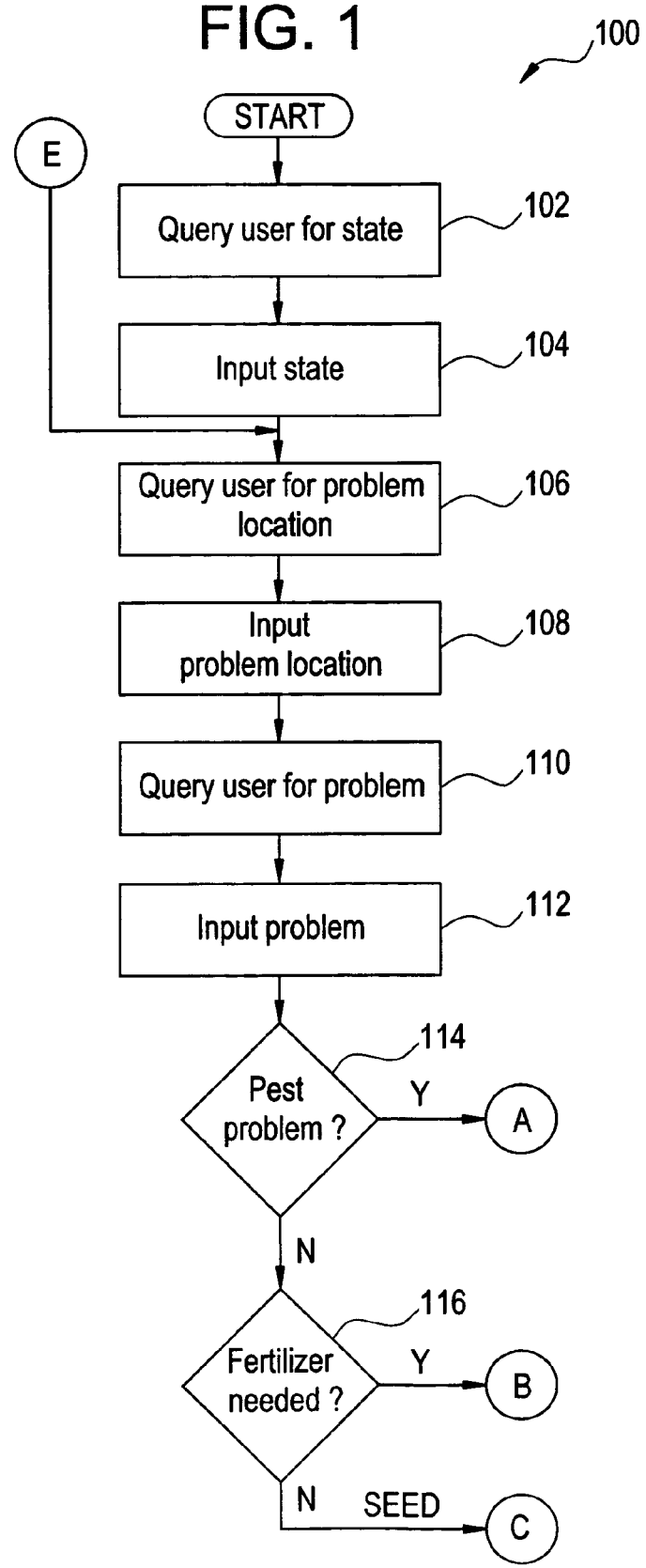
FIG. 1 is a portion of a flowchart of a method for identifying gardening materials according to one embodiment of the present invention.

A portion of a flowchart 100 of a preferred embodiment of the invention is illustrated in FIG. 1. A user is queried for the state in which the gardening problem exists at step 102. The user's response is input at step 104. Knowledge of the state in which a problem such as an insect infestation is occurring is mandatory because pesticides may be approved for use only in some states and may be approved for only certain uses in states where the pesticides are approved. The user is queried for the location of the gardening problem at step 106. Among the possible locations are flowers, vegetables, lawn, fruits, trees/shrubs, pets, homes, and pools/spas. The user's response is input at step 108. The user is then queried for the type of problem at step 110 and the user's response is input at step 112. If the user's response indicates a pest problem at step 114, step 202 is performed next. Otherwise, if the user's response indicates a fertilizer need at step 116, step 302 is performed next. If the user's response indicates neither a pest problem nor a fertilizer problem, the user desires information pertaining to seeds and step 502 is performed next.

Figure 2:
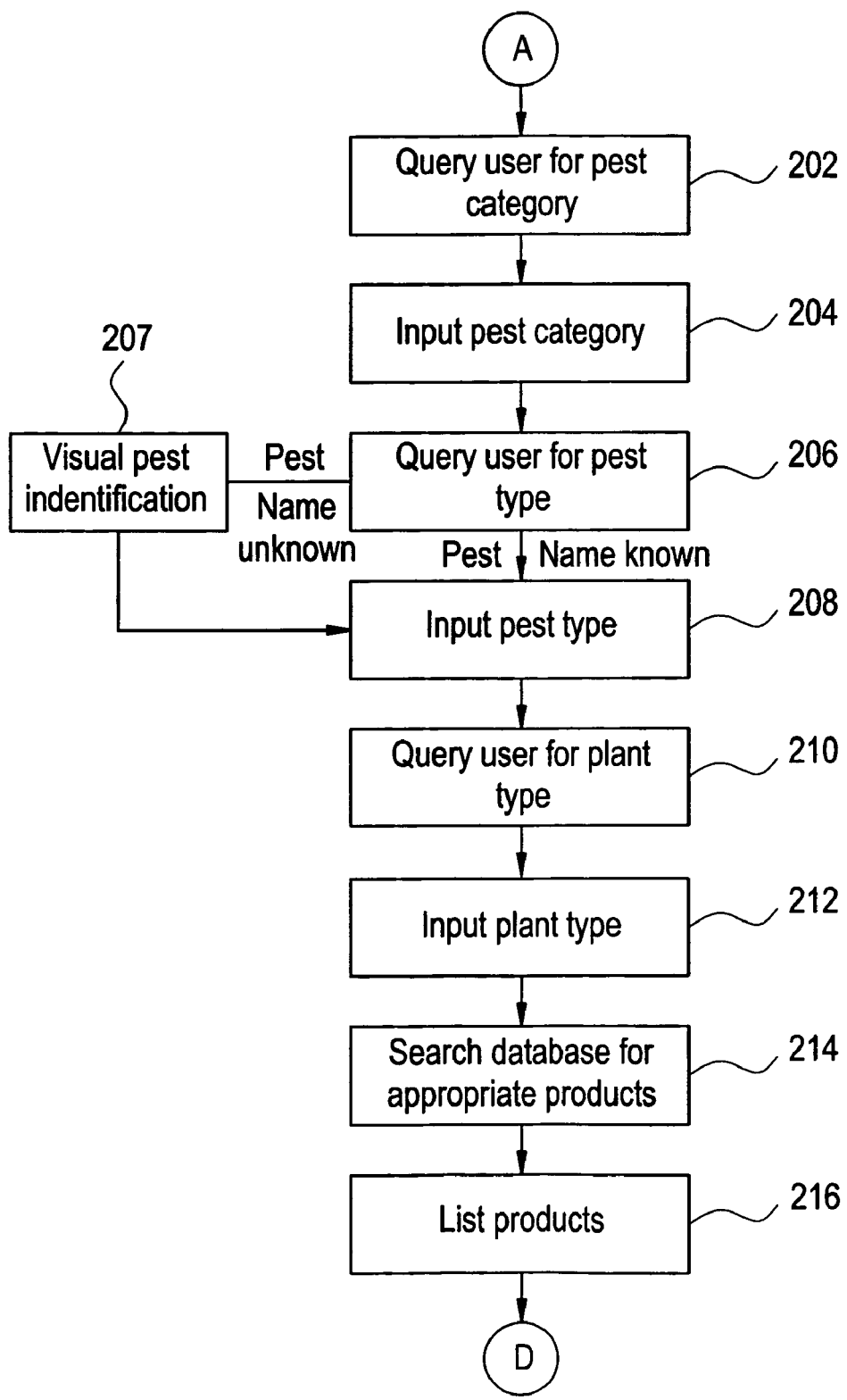
FIG. 2 is a second portion of the flowchart of FIG. 1.

Referring now to FIG. 2, if the user has indicated a pest problem, the category of the pest is requested at step 202. Among possible pest categories are insects, fungi, nematodes, snails/slugs, weeds and diseases. The user's response is input at step 204. Next, the user is asked to identify the pest type at step 206. The pest type is the specific pest that is causing the problem (e.g., Japanese beetle, dandelion). In an embodiment such as a web site, step 206 may include presenting a user with a textual list of pest types. If the user does not know the name of the pest at step 206, the user may be presented with illustrations to help the user identify the name of the pest at step 207. In a simple alphanumeric point-of-sale display such as that discussed above, such illustrations may be presented in a printed book associated with the display.

It should be noted that a user may not be able to specify a pest type at step 202. For example, if a user is concerned with a plant whose leaves are turning brown, the user may not know whether the cause is a fungus on the leaves, an insect, or a snail or slug attacking the plant's roots. To accommodate such situations, step 202 may also include allowing a user to select a symptom (e.g. brown leaf) rather than a specific pest. Further inquiries and responses (Are the brown leaves withered? Are there holes in the brown leaves?) may then be used to elicit further description of the problem such that a probable pest can be identified.

The pest type identified by the user is input at step 208. Where appropriate, the user is queried for the plant type at step 210. One situation in which the plant type query of step 210 is useful is where the user has specified a problem location such as "lawn," because the preferred chemical for killing dandelions may differ for Kentucky bluegrass and Bahia grass. If the plant type query of step 210 is made, the user's response is input at step 212. The database is then searched at step 214 using the information supplied by the user (state, pest category and type, plant type, where the pest is found, etc.). Appropriate products are then listed at step 214. The user may also be presented with a "More Information" button for some or all of the products listed at step 214 (and in other instances where products are listed as discussed below). This option allows a user to view a video or listen to an audio file explaining how to use the product or view research trials to help determine the best solution to their problem. The process then continues at step 602 (discussed further below).

Figure 3:
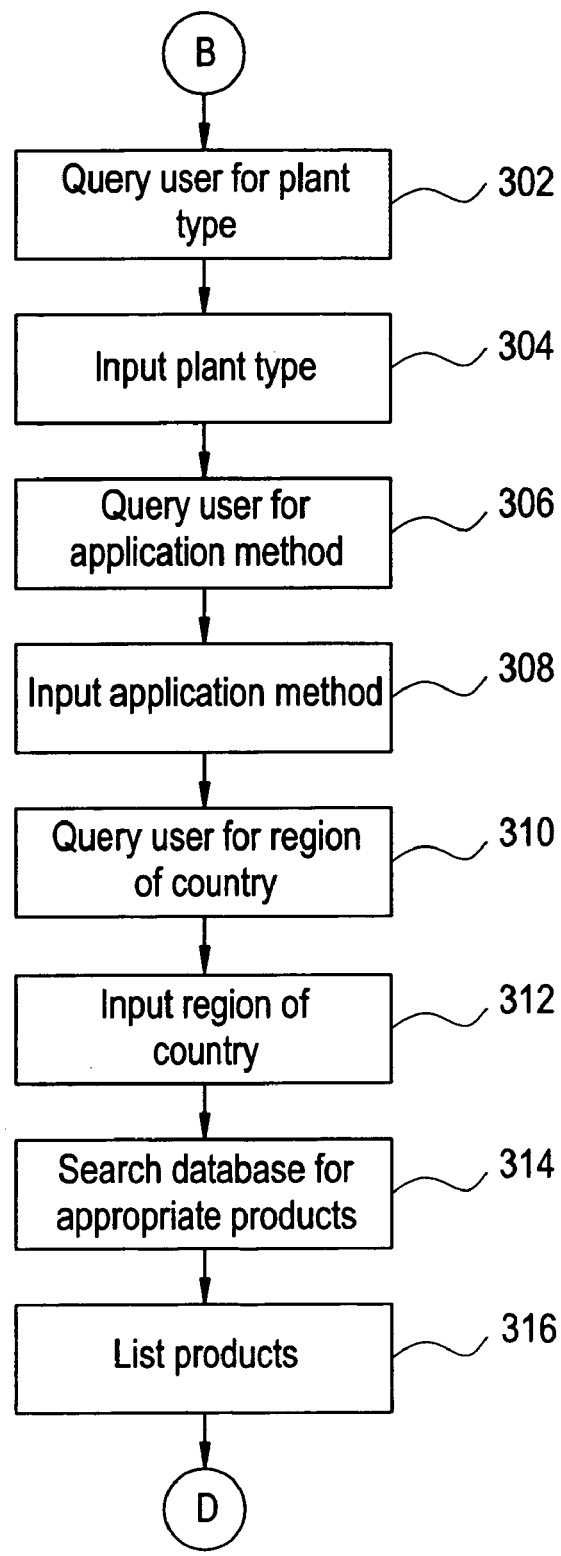
FIG. 3 is a third portion of the flowchart of FIG. 1.

Referring now to FIG. 3, if a user indicates the need for fertilizer, the user is queried for the plant type (e.g., lawns, trees, shrubs, vegetables, fruit, indoor) at step 302 and the user's response is input at step 304. If the user indicates that the plant type is indoor at step 304, then the user is further queried as to the type of indoor plant (e.g., African violet, orchid, cactus, tropical, etc.). The user is queried for the desired application method (e.g. granular, liquid, water-soluble, stakes or spikes) at step 306. The user's response is input at step 308.

Figure 4:
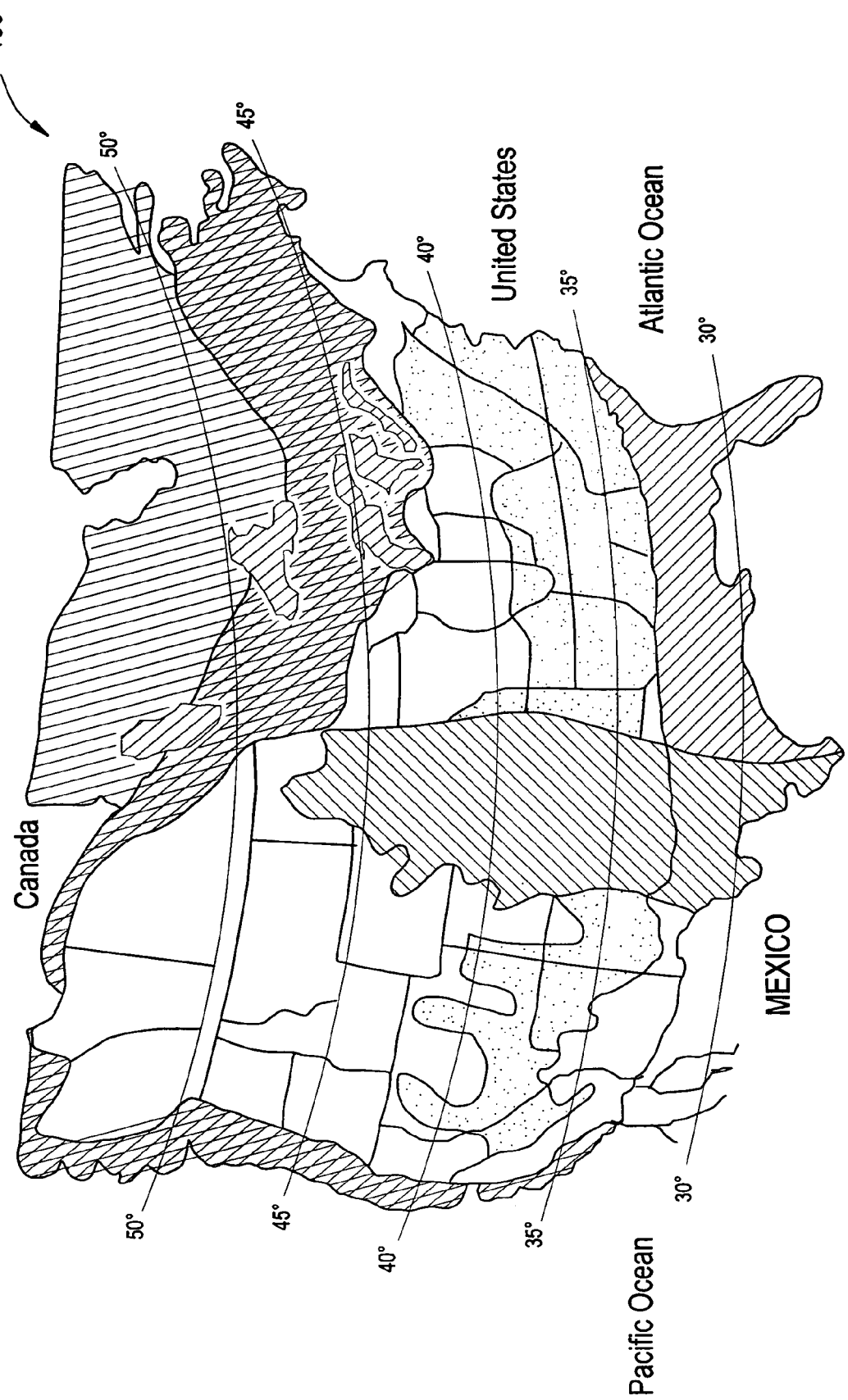
FIG. 4 is a diagram showing regions of the U.S. according to one embodiment of the present invention.

The user is then queried for region of the country at step 310. In a preferred embodiment, the user is queried for the region of the country by presenting the user with a map of the country divided into different regions, such as the map 400 of FIG. 4. The regions of the country may comprise USDA Hardiness Zones, or may be defined differently, depending upon the particular application. The regions of the country may also be different for different purposes. For example, the country may be divided into one set of regions for lawn fertilizer inquiries, while a different set of regions may be applicable for lawn seed inquiries. Although the user has already indicated the state of interest, it will be apparent from FIG. 4 that states may fall into two or more regions. This is especially true of large states such as California and Texas. The region of the country indicated by the user is input at step 312.

After the user responses have been input, the database is searched for an appropriate product based on the user responses at step 314. The products are then listed for the user at step 316. The process then continues at step 602 (discussed further below).

Figure 5:
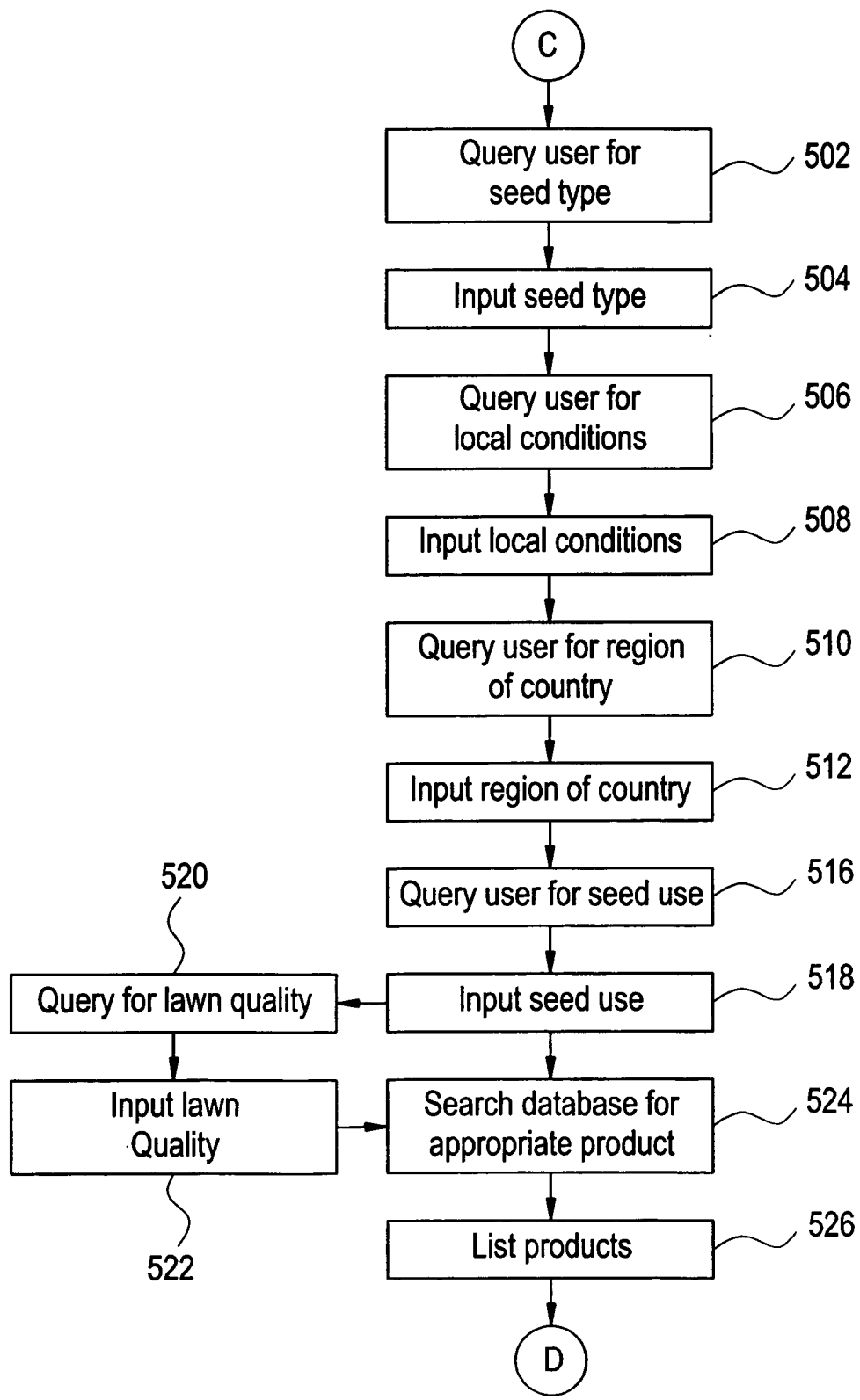
FIG. 5 is a fourth portion of the flowchart of FIG. 1.
Figure 6:
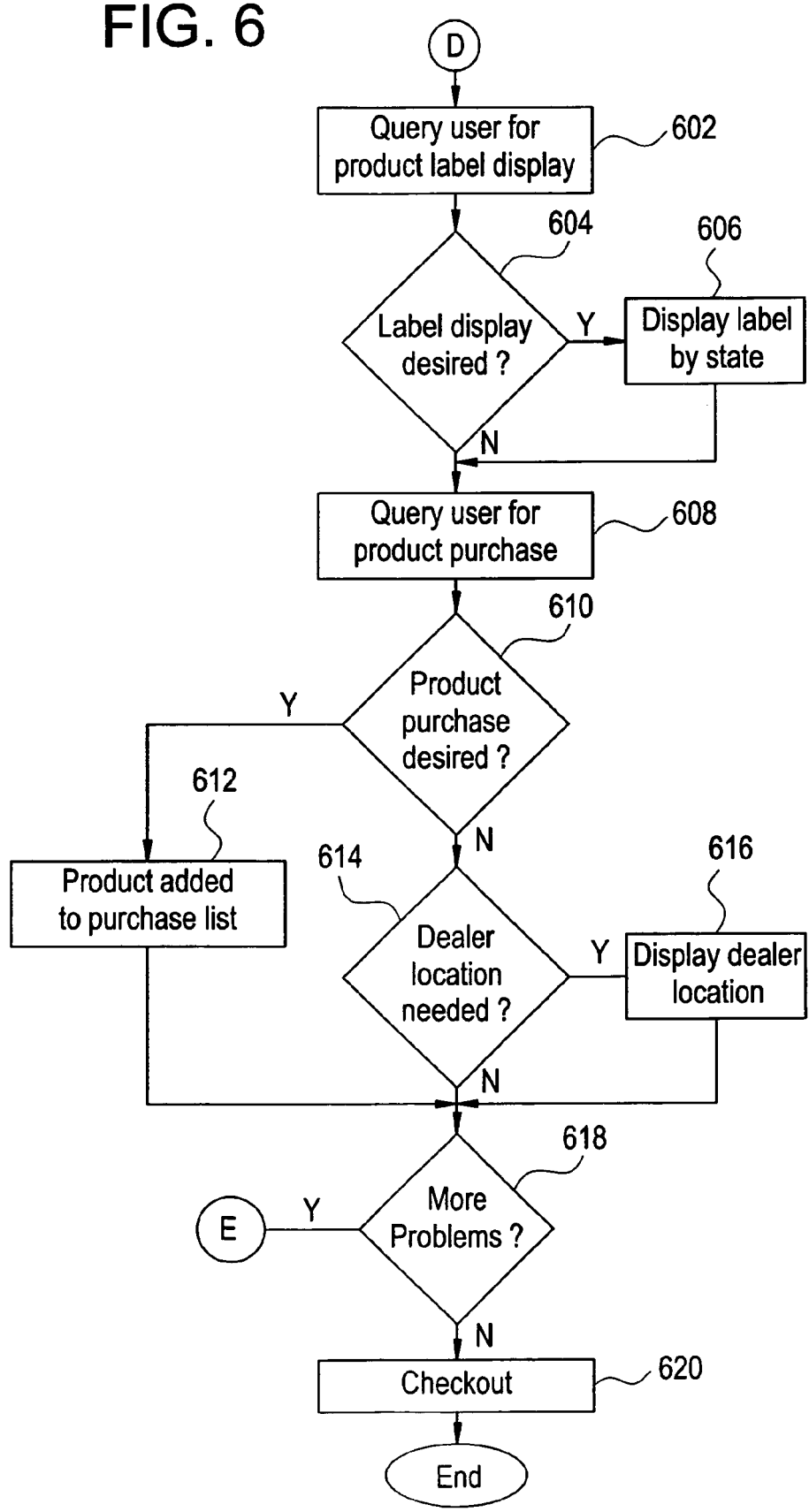
FIG. 6 is a fifth portion of the flowchart of FIG. 1.

Referring now to FIG. 5, if the user desires information pertaining to seeds, the user is queried for seed type (e.g. fescue, bermuda, centipede) at step 502 and the user's response is input at step 504. The user is queried for local conditions at step 506. Local conditions again may depend upon seed type. For example, if a user has indicated that they desire bluegrass seeds, the specific bluegrass variety may depend upon how much shade is received in the area of interest to the user; thus, amount of shade may be a relevant local condition and, in an Internet embodiment of the present invention, a user may be presented with choices such as "sunny," "shady," and "partly shady." The user's response to the local conditions query is input at step 508.

The user is then queried for the relevant region of the country at step 510. As discussed above, in a preferred embodiment, this query is made by presenting a user with a map of different regions such as the map 400 of FIG. 4. The user's response is input at step 512.

The user is queried for the way in which the seed will be used (e.g. new lawn, patching, or over seeding) at step 516. The user's response is input at step 518. The user is then asked to select a lawn quality at step 520. As used herein, lawn quality refers to whether a grass is a cool season grass (a grass such as fescue that stays green in winter but struggles in hot weather) or a warm season grass (a grass such as bermuda that browns in winter but thrives in warm weather). The user's response in input at step 522.

After the user responses have been input, the database is searched for an appropriate product based on the user responses at step 524. The products are then listed for the user at step 526. The process then continues at step 602.

After the list of appropriate products is presented to the user, the user is queried as to whether the user wishes to see the label of a product at step 602. Seeing the label of a product allows the user to determine, for example, the application methods and application rates with which the product may be used. Seeing the label and MSDS (Material Safety Data Sheet) also allows the user to determine any safety concerns that may impact the user's decision as to whether the product is appropriate. For example, certain insecticides that may be appropriate for use on ornamental shrubs may indicate that the pesticide should not be used while pets are around, until the product has dried.

If the user indicates a desire to see the label, the label is displayed by state at step 606. As discussed above, different states may regulate substances such as fertilizers, seed and pesticides differently. These regulations may require different labels, reflecting possible differences such as sites and pests, to be placed on the product labels. If the product is a pesticide, the MSDS for that pesticide may be displayed in addition to or in place of the product label at step 606.

The user is next queried as to whether a product purchase is desired at step 608. If the user indicates that a purchase is desired at step 610, the product is added to a list of purchases at step 612 and step 618 is performed next. If the user indicates that a purchase is not desired at step 610, the user is queried as to whether the location of a retailer selling the product is desired at step 614. If the user indicates that a retailer location is desired, the location of at least one retailer (and perhaps many) is displayed at step 616. In order to facilitate locating a retailer in close proximity to the user, the user's zip code may be obtained during step 616.

The user is then queried as to the existence of additional gardening problems at step 618. If the user has additional gardening needs, step 106 is repeated. Otherwise, the checkout process is performed at step 620. The checkout process is the process of collecting shipping and payment information from the user if the user has indicated the desire to purchase any of the previously-identified products. As part of the checkout process, the state selected in step 102 is compared to the "ship to" address. This verification guarantees compliance with state regulatory requirements. Checkout marks the end of the process.

Besides the specific inquiries discussed above, any number of additional queries may also be appropriate. Such queries will depend upon the specific material of interest.

A database has been mentioned in connection with the description of many of the steps described above. The database allows products to be identified by numerous criteria, such as legality by state, usefulness against various pests, appropriateness for various sites (e.g. vegetables, flowers, house, etc.) and other criteria as described above. The database may also contain illustrations of various pests to facilitate their identification by the user. The database may contain various other elements (e.g. ingredients, manufacturer, application method, etc.) depending upon the specific application. Such a database may be implemented using any number of commercially-available database products which are well-known to those of skill in the art and need not be discussed in further detail herein.

Figure 7:
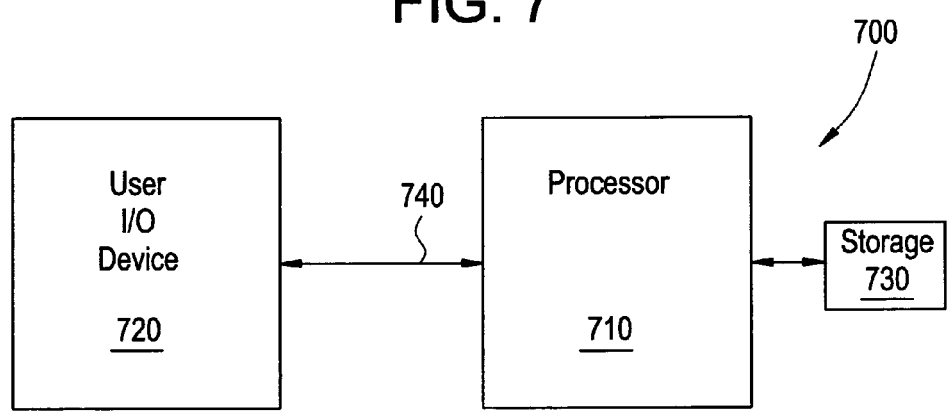
FIG. 7 is a block diagram of a system according to an embodiment of the present invention.

FIG. 7 is a hardware block diagram of a system 700 including a processor 710 attached via a signaling path 740 to a user I/O device 720 and a storage device 730. In a preferred embodiment, the processor 710 comprises an Internet server, the user I/O device 720 comprises a personal computer equipped with an Internet browser, and the signaling path 740 comprises, at least partially, an Internet connection via the public switched telephone network. The aforementioned database is stored in storage device 730. In other preferred embodiments, such as point-of-sale terminals, the user I/O device comprises a simple alphanumeric display and keypad, while the signaling path 740 comprises a hard-wired connection to the processor 710.

A method and apparatus for identifying an appropriate gardening material has been described. The method identifies an appropriate gardening product based upon user responses to a plurality of inquiries. In a preferred embodiment, the method is practiced as an Internet site that provides the user with the opportunity to purchase identified gardening materials through the Internet. In a preferred embodiment, the gardening materials are identified based at least in part upon the geographic location of the user, which may be specified by state, zip code, region of the country, or any combination of these. The product label, which may differ from state to state, is also displayed in a preferred embodiment based upon the state indicated by the user.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A method for identifying gardening material comprising:
   querying a user for at least one geographic region;
   receiving the at least one geographic region from the user;
   querying the user for the location of a gardening problem within said geographic region;
   receiving the at least one gardening problem from the user;
   querying database and generating a series of questions in response to the received at least one gardening problem;
   receiving a response to the series of questions from the user;
   querying the database and identifying at least one gardening material based upon a response to at least one of the querying; and
   wherein all the above steps are performed using a computer and a computer program running on the computer.

2. The method of claim 1, further comprising the steps of:
   offering the user the opportunity to purchase the at least one gardening material.

3. The method of claim 1, further comprising the step of displaying a label associated with the gardening material to the user.

4. The method of claim 1, wherein the at least one gardening material is identified based at least partially upon the user's response to the querying directed toward the geographic region.

5. The method of claim 4, further comprising the step of displaying a label associated with the gardening material to the user, wherein the label varies depending upon the geographic region.

6. The method of claim 5, wherein the label is a material safety data sheet.

7. The method of claim 5, wherein the label is a label applied to the gardening material for retail sales.

8. The method of claim 1, wherein the querying a user for at least one geographic region is directed toward the user's geographic region and at least one gardening material is identified based at least partially upon the user's geographic region.

9. The method of claim 1, further comprising the steps of:
presenting the user with at least one query directed toward the symptoms of a problem observed by the user; and
identifying a pest based at least partially upon the user's responses to the inquiry.

10. The method of claim 9, wherein the pest is one of insects, fungi, nematodes, snails, slugs weeds and diseases.

11. The method of claim 1, where the gardening material is one of: pesticides, fertilizers and seeds.

12. The method of claim 1, further comprising the step of displaying a list of retailers from which the gardening material is available.

13. The method of claim 1, wherein the geographic region further comprises a state.

14. A method identifying a garden material comprising:
querying a user for a geographic region in which the garden material is to be utilized;
receiving the geographic region from the user;
querying the user for the location of a gardening problem within said geographic region;
querying the user for an object affected by the gardening problem, wherein the object affected by the gardening problem includes at least one of flowers, vegetables, lawn, fruits, trees/shrubs, pets, homes, and pools/spas;
receiving the said location and the object affected by the gardening problem from the user;
querying the user for a type of gardening problem, wherein the type of garden problem includes at least one of pests, fertilizer need, and information pertaining to seeds;
receiving the type of gardening problem from the user;
determining whether the type of gardening problem is a pest problem, fertilizer need problem, or information pertaining to seeds;
generating a list of products based partially upon the geographic region; and
wherein all the above steps are performed using a computer and a computer program running on the computer.

15. The method for identifying a garden material of claim 14, further comprising:
after generating the list of products, querying the user for a product label display;
determining whether the product label display is desired;
displaying the product label display by geographic region when the product label display is desired;
querying the user for product purchase;
determining whether the product purchase is desired;
adding product to purchase list when desired;
determining whether a dealer location is needed, when dealer location is needed displaying the dealer location;
querying user for additional problems; and
determining whether additional problems exist, when no additional problems exist performing the checkout process.

16. The method of claim 14, wherein the geographic region further comprises a state.

* * * * *